(12) United States Patent
Fassone et al.

(10) Patent No.: US 11,144,864 B2
(45) Date of Patent: Oct. 12, 2021

(54) METHOD AND SYSTEMS FOR TRACKING CABLE DRUMS AND LENGTH OF CABLE ON THE DRUM

(71) Applicant: Prysmian S.p.A., Milan (IT)

(72) Inventors: Davide Fassone, Milan (IT); Antonino Arena, Milan (IT)

(73) Assignee: PRYSMIAN S.P.A., Milan (IT)

( * ) Notice: Subject to any disclaimer, the term of this patent is extended or adjusted under 35 U.S.C. 154(b) by 140 days.

(21) Appl. No.: 16/725,099

(22) Filed: Dec. 23, 2019

(65) Prior Publication Data

US 2020/0210941 A1    Jul. 2, 2020

(30) Foreign Application Priority Data

Dec. 28, 2018  (IT) .................... 102018000021304

(51) Int. Cl.
| | |
|---|---|
| *G06Q 10/08* | (2012.01) |
| *G01D 5/12* | (2006.01) |
| *H04W 4/02* | (2018.01) |
| *B65H 16/02* | (2006.01) |
| *B65H 63/00* | (2006.01) |

(52) U.S. Cl.
CPC .......... *G06Q 10/08* (2013.01); *B65H 16/025* (2013.01); *B65H 63/00* (2013.01); *G01D 5/12* (2013.01); *H04W 4/02* (2013.01); *B65H 2511/114* (2013.01)

(58) Field of Classification Search
CPC ...... G06Q 10/08; B65H 16/025; B65H 63/00; B65H 2511/114; G01D 5/12; H04W 4/02
See application file for complete search history.

(56) References Cited

U.S. PATENT DOCUMENTS

| | | | |
|---|---|---|---|
| 2006/0202817 A1* | 9/2006 | Mackenzie ............ | G06Q 10/08 340/539.13 |
| 2014/0349267 A1* | 11/2014 | Thornton ............... | G09B 23/02 434/276 |
| 2016/0023863 A1* | 1/2016 | Martin ................. | G01D 5/3473 242/563.2 |
| 2017/0191822 A1* | 7/2017 | Becker .................... | G01S 17/89 |

FOREIGN PATENT DOCUMENTS

| | | |
|---|---|---|
| EP | 3136320 A1 | 3/2017 |
| WO | 9630721 A2 | 10/1996 |

OTHER PUBLICATIONS

Wikipedia, "Inclinometer," May 27, 2019, 6 pages.

* cited by examiner

*Primary Examiner* — Philip J Chea
*Assistant Examiner* — Hassan A Khan
(74) *Attorney, Agent, or Firm* — Slater Matsil, LLP

(57) ABSTRACT

The present disclosure refers to a method and a system for tracking cable drums and length of cable on the drum. A method includes attaching a tracker device with a tracker identifier to a cable drum with a drum identifier, said drum identifier being associated in a database with drum dimensions and with cable dimensions of a cable stored on the drum. The method includes associating in the database the drum identifier also with the tracker identifier. The method includes when an event comprising at least a shock and/or a number of rotations of the cable drum around a longitudinal axis occurs, activating a first electronic circuit of the tracker device including a sensing device that detects at least the event, storing the detected event in a local memory of the tracker device and switching the first electronic circuit to standby mode after the detected event is stored.

21 Claims, 3 Drawing Sheets

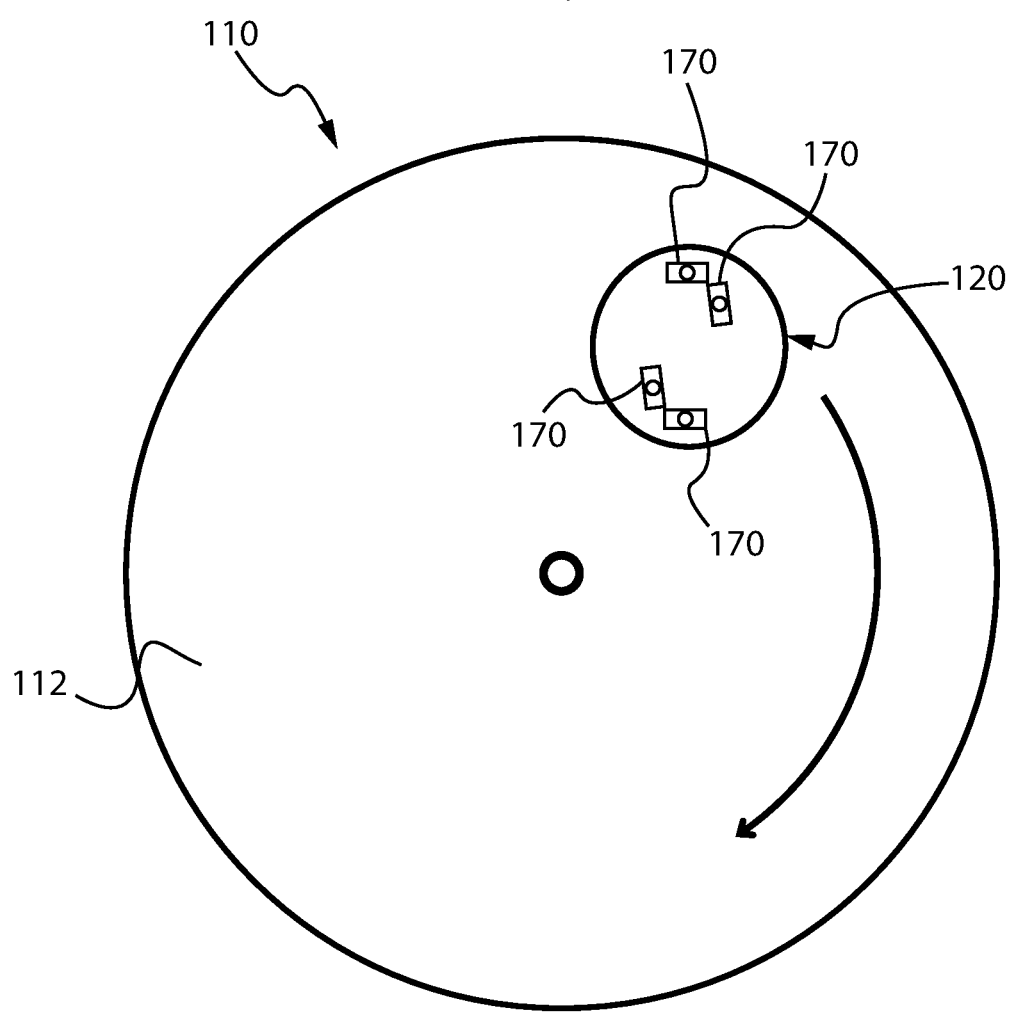

METHOD AND SYSTEMS FOR TRACKING CABLE DRUMS AND LENGTH OF CABLE ON THE DRUM

CROSS-REFERENCE TO RELATED APPLICATIONS

This application claims priority to Italian Patent Application No. 102018000021304, filed on Dec. 28, 2018 which application is hereby incorporated herein by reference.

TECHNICAL FIELD

The present invention relates generally to cable drums, and, in particular embodiments, to methods and systems for tracking cable drums and length of cable on the drum.

BACKGROUND

As it is known, drums with reels of cable of different types and of different lengths are typically stored concurrently in large inventory storage area from which specific cable drums are selected and picked up on the basis of specific projects or construction to be performed.

Once the cable wound on a drum is used, which results in an empty drum, the empty drum is moved to a storage area which can be the initial inventory storage or a different storage area. The empty drum is then returned to the workhouse of the cable manufactory to be reused for winding a new cable.

Typically, once a customer makes an order for cable drums, he needs to trace in real-time the position of the cable drums throughout the shipping and delivery process in order to improve the project planning. These tracking data allow analyzing and comparing efficiencies between transporters based on actual delivery times.

Furthermore, more and more frequently, customers request to receive also updated information about the cable length on the drums in order to reduce the likelihood of running short on stock and to reduce the amount of time that empty drums are left on site waiting for being returned to the workhouse of the cable manufactory. This facilitates the management of the stock and allows improving the pick-up planning for empty drums and the delivery of new orders, thus increasing the transport efficiency.

In order to improve the order planning and facilitating the stock management of products in the inventory storage, it is known to provide traceable cable drums having tracking means.

US2016/0023863 describes a system and method for tracking the remaining length of a material wound on a reel is disclosed. In the system, two sensors deployed relative to the reel (and to each other) produce a detection signals when a detection element mounted on the reel is near the respective sensor in an order indicative of forward or reverse reel rotation. The system further includes a processor operably receiving the detection signals to count a total number of forward rotations of the reel, which count is saved in memory. A battery powers the processor, memory, and sensors. The system further includes a transceiver that removably and operably couples between the memory and a calculator that calculates the remaining length of the material wound on the reel based on the total number of forward rotations of the reel. The system may also record the time and location associated with the rotations.

US2006/0202817 discloses that in GPS based and other types of asset tracking system, event masking rules may be applied at asset tracking units and/or at a central station to determine whether to report events detected by the asset tracking units. The events may pertain to transportation vehicles such as truck trailers or cargo containers to which the asset tracking units are attached. The event masking rules may be defined at the central station and downloaded by satellite communication to the asset tracking units and/or the rules may be defined locally, at the asset tracking units.

SUMMARY

According to a first aspect, the present disclosure relates to a method for tracking cable drums comprising the steps of: a) attaching a tracker device with a tracker identifier to a cable drum with a drum identifier, said drum identifier being associated in a database with drum dimensions and with cable dimensions of a cable stored on the drum; b) associating in the database the drum identifier also with the tracker identifier; c) when an event comprising at least a shock and/or a number of rotations of the drum around a longitudinal axis (Y) occurs, activating a first electronic circuit of the tracker device including a sensing device that detects at least the event, storing the detected event in a local memory of the tracker device and switching the first electronic circuit to standby mode after the detected event is stored; d) activating a second electronic circuit including a communication circuit that connects to a communication system and a positioning circuit that detects the position coordinates of the tracker device and the cable drum, transmitting via the communication system the tracker identifier, the detected position coordinates and the detected events stored in the local memory; e) associating the transmitted detected position coordinates and the transmitted detected events to the tracker identifier and the drum identifier in the database; and f) calculating using the data stored in the database the remaining length of the cable on the cable drum, where the activating of the second electronic circuit and the subsequent steps occur at scheduled time intervals and where after the transmitting step the second electronic circuit is switched to standby mode.

In an embodiment, after the successful transmitting step at point d) at least part of the local memory is cleaned.

In this way, the managing of the available space of the local memory is optimized.

In an embodiment, the positioning circuit is configured to detect the position coordinates of the tracker device and the cable drum by means of a satellite positioning circuit or by means of data retrieved from the communication system by the communication circuit.

In this way, a redundancy for the localization of the cable drum is created; this improves the reliability of the tracking of the cable drum.

Through retrieved data, either from the satellite positioning circuit as well as from the communication circuit, the system checks and ensures that transmission datetime retrieved from the network is correct by comparing provided datetime to the UTC datetime of given location.

In an embodiment, the method comprises before the second electronic circuit is switched to standby mode the following steps: checking whether new configuration data are available in the database and in case of a positive outcome of this verification downloading said new configuration data and applying said new configuration to the tracker device electronic circuits. This allows to upgrade the electronic circuit of the tracker device, or to configure it based on certain customer demands.

In an embodiment, the sensing device detects also at least one environmental parameter.

The detection of the environmental parameters can be used for developing predictive analysis of the cable drum general conditions in order to determine its suitability for recovery, reconditioning and/or disposal.

In an embodiment, the activating of the second electronic circuit and the subsequent steps additionally occur when the tracker device has been attached to the flange of the cable drum.

In an embodiment, the activating of the second electronic circuit and the subsequent steps additionally occur when a control signal is received by the communication circuit.

This control signal can be a request of synchronization signal.

In this way, it is possible to receive the detected information about the cable drum and the cable length at any desired time.

In an embodiment, the activating of the second electronic circuit and the subsequent steps occur when a control signal is received by a near-field communication (NFC) switch device associated to the tracker device and configured for activating/deactivating the tracker device.

In an embodiment, the sensing device is configured to detect shocks above a predetermined threshold force value.

This implies the saving of the space of the local memory and of the battery charge of the tracking device.

In an embodiment, the sensing device comprises: at least two mechanical tilt switches positioned parallel to and off-centered to a flange of the cable drum so that they sequentially assume the open position and the close position when the cable drum rotates around a longitudinal axis defining a sequence of change of state of the at least two mechanical tilt switches that corresponds to a complete rotation of the cable drum; —one or more shock sensors configured for detecting shocks of the cable drum; the detection of the number of rotations of the cable drum around its longitudinal axis (Y) comprising the following steps: —detecting the change of state of the mechanical tilt switches; counting the number of rotations of the cable drum by counting the occurrence of the sequence of change of state of the at least two mechanical tilt switches that corresponds to a complete rotation of the cable drum.

This counting is very reliable since it is based on the detection of a predetermined sequence of events involving two or more sensors, i.e. the at least two mechanical switches. Then, also the tracking of the cable length is very reliable.

In an embodiment, the one or more shock sensors are also configured for verifying whether the cable drum is rotating around its longitudinal axis (Y) and the step of counting the number of rotations of the cable drum starts if the one or more shock sensors verify that the cable drum is rotating around its longitudinal axis (Y).

In an embodiment, the step of counting the number of rotations of the cable drum starts if the one or more shock sensors detect a substantially constant rotation of the cable drum around its longitudinal axis (Y) at a rotation speed higher than a minimum value.

In an embodiment, the method for counting the rotations of a cable drum comprises the step of correcting with a gyroscope the number of counted rotations when the cable drum is rotating at a rotation speed above a maximum value, or when the cable drum is rotating around a longitudinal axis not parallel to the earth plane. This prevents a possible false counting of the number of rotations due to blocking of the mechanical tilt switches occurring due to centrifugal force when the cable drum is rotating at high speed, or occurring when the cable drum is rotating under an angle. Depending on size of the cable drum and the distance of the tilt switches to the longitudinal axis of the cable drum the blocking of the tilt switches may occur at a rotation speed higher than a revolution per 500 ms.

In an embodiment, the tracker device comprises a main processing and control unit that has an internal clock which performs a countdown of given time corresponding to the scheduled time interval and the method for counting the rotations of a cable drum provides a step wherein the event detected by the sensing device is stored in the local memory with the countdown value corresponding to the time of the activation of said first electronic circuit.

In another aspect, the present disclosure relates to a system for tracking cable drums configured for implementing the above method comprising: a cable drum; a tracker device attached to the cable drum; a database capable of communicating with the tracker device through a communication system; a central processing unit associated to the database.

BRIEF DESCRIPTION OF THE DRAWINGS

Further characteristics will be apparent from the detailed description given hereinafter with reference to the accompanying drawings, in which:

FIG. 3 is a plant view of the flange of the cable drum with the tracker device provided with mechanical tilt switches.

DETAILED DESCRIPTION OF ILLUSTRATIVE EMBODIMENTS

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

Applicant has observed that the tracking system for cable drums should be able to track position and remaining cable length on the drum.

In particular, Applicant has observed that the remote tracker devices, that are attached to the cable drums and that must be powered with electric energy for collecting and transmitting data, needs to have a minimal autonomy of 24 months.

Therefore, the electronic circuit of such remote tracker devices intended to communicate the tracking data cannot be activated all the time, but at the same time the events effecting cable length or drum integrity must be recorded.

Applicant has faced the problem of reducing the energy consumption of the remote tracker devices in order to obtain the minimal autonomy of 24 months assuring the recording of the events related to the cable drum and to the cable length.

Applicant has realized that if the transmission of the tracking data is not performed in real-time and then if it is intermittent occurring at predefined times, the electronic circuit intended to communicate the tracking data does not need to be continuously powered on but it can be activated at said predefined times involving energy consumption reduction.

Applicant, then, has thought to save in a local memory of the tracking device detected events related to the cable drum and to the cable length once they have been detected, so that the transmission of this saved data can occur at any predefined time.

This involves a reduction of the energy consumption of the electronic circuit of the tracker device.

Moreover, Applicant has thought also to switch such an electronic circuit to a standby mode after the transmission of the detected saved data have been performed.

This allows a further saving of the battery charge of the tracker device.

Figure 1:
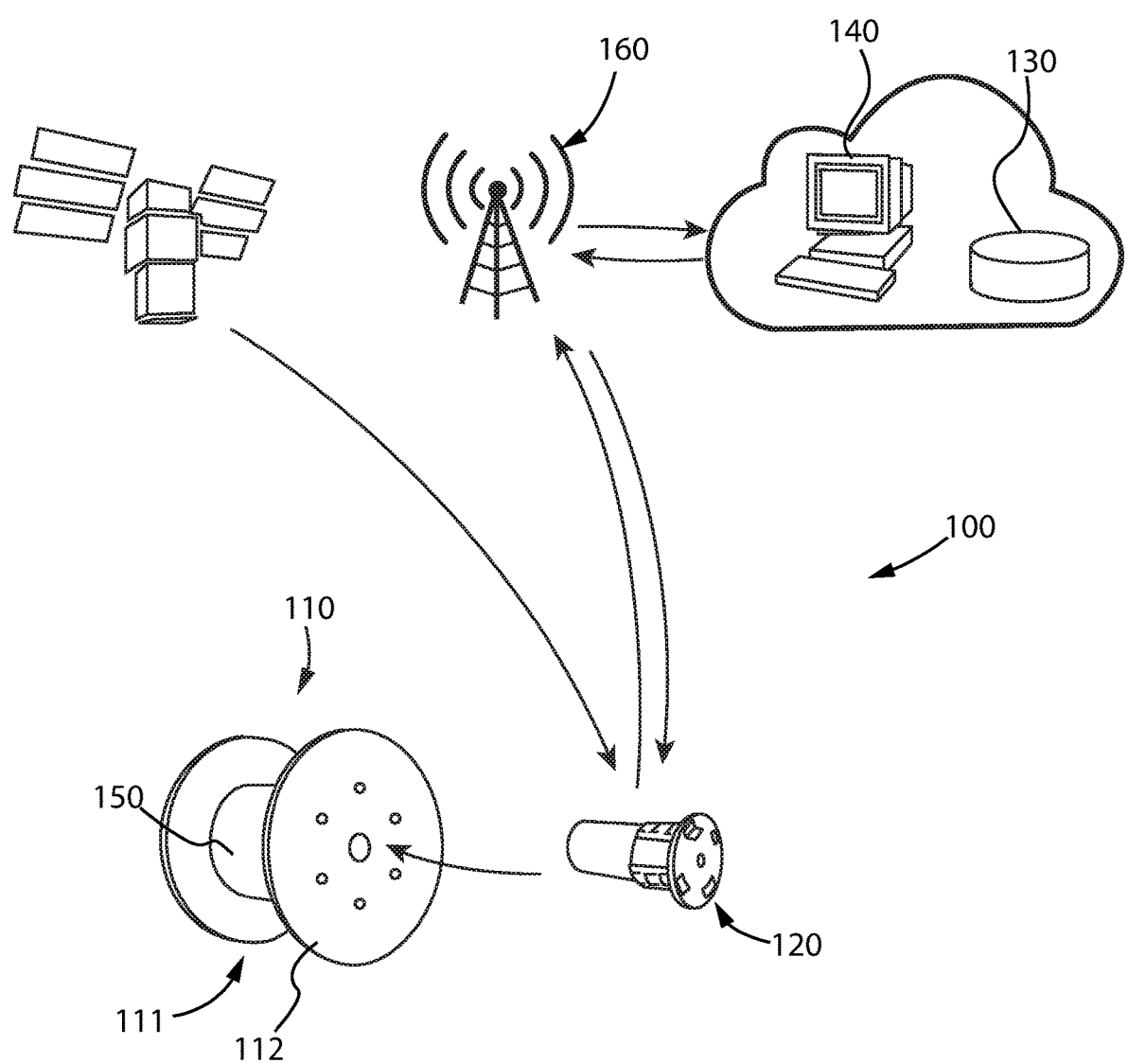
FIG. 1 is a schematic view of a tracking system according to the present disclosure.

A system 100 for tracking cable drums according to the present disclosure is shown in FIG. 1.

The system 100 for tracking cable drums comprises a cable drum 11o, a tracker device 120 attached to the cable drum 11o, a database 130 capable of communicating with the tracker device 120 and a computing device comprising a processor 140 associated to the database 130.

The cable drum 110 can be made of various materials, such as wood, metal or polymeric material. The cable drum 110 comprises a reel region 111 which, optionally, presents a cylindrical shape. The reel region 111 is configured for supporting a wound cable 150 of predetermined length. The cable 150 can be a telecommunication cable, an energy cable or a hybrid cable.

The cable drum 110 has a longitudinal axis Y and comprises two opposed flange regions 112 placed at opposite ends of the reel region 111. The flange regions 112 delimit a storage space for the wound cable 150. One of the flange regions 112 has a housing optionally presenting a cylindrical shape; this housing, in particular, is adapted to receive the tracker device 120. The housing can be provided on the flange region 112 after the cable drum 110 is assembled or during the manufacturing of the cable drum 110. As an example, in case the cable drum 110 is made of wood, the housing can be obtained by drilling the flange region 112.

The cable drum 110 is associated with a drum identifier that can be stored in a barcode/QRcode label or in a RFID/NFC tag attached to the cable drum 110.

The drum identifier is stored also in the database 130 associated to the drum dimensions and dimensions of the cable stored in the cable drum. So no information about dimensions, nor cable or drum, are directly stored within the tag or label attached to the cable drum 110, thus avoiding any information leaks in case of tampering.

The tracker device 120 is associated with a tracker identifier that can be stored in a barcode/QRcode label or in a RFID/NFC tag attached to the tracking device 120.

The tracker device 120 comprises: a local memory 121; a first electronic circuit 122 including a sensing device 128 capable of detecting at least a shock and a number of rotations of the cable drum 110 around its longitudinal axis Y; a second electronic circuit 124 including a communication circuit 125 capable of wirelessly connecting to a communication system 160 and a positioning circuit 126 capable of detecting the position coordinates of the tracker device 120 and then of the cable drum 110.

The tracker device 120 is preferably energized by a suitable battery 123. The tracker device 120 optionally comprises also a solar panel associated to the battery in order to increase the battery efficiency and the consequent reduction in size of such a battery.

Figure 2:
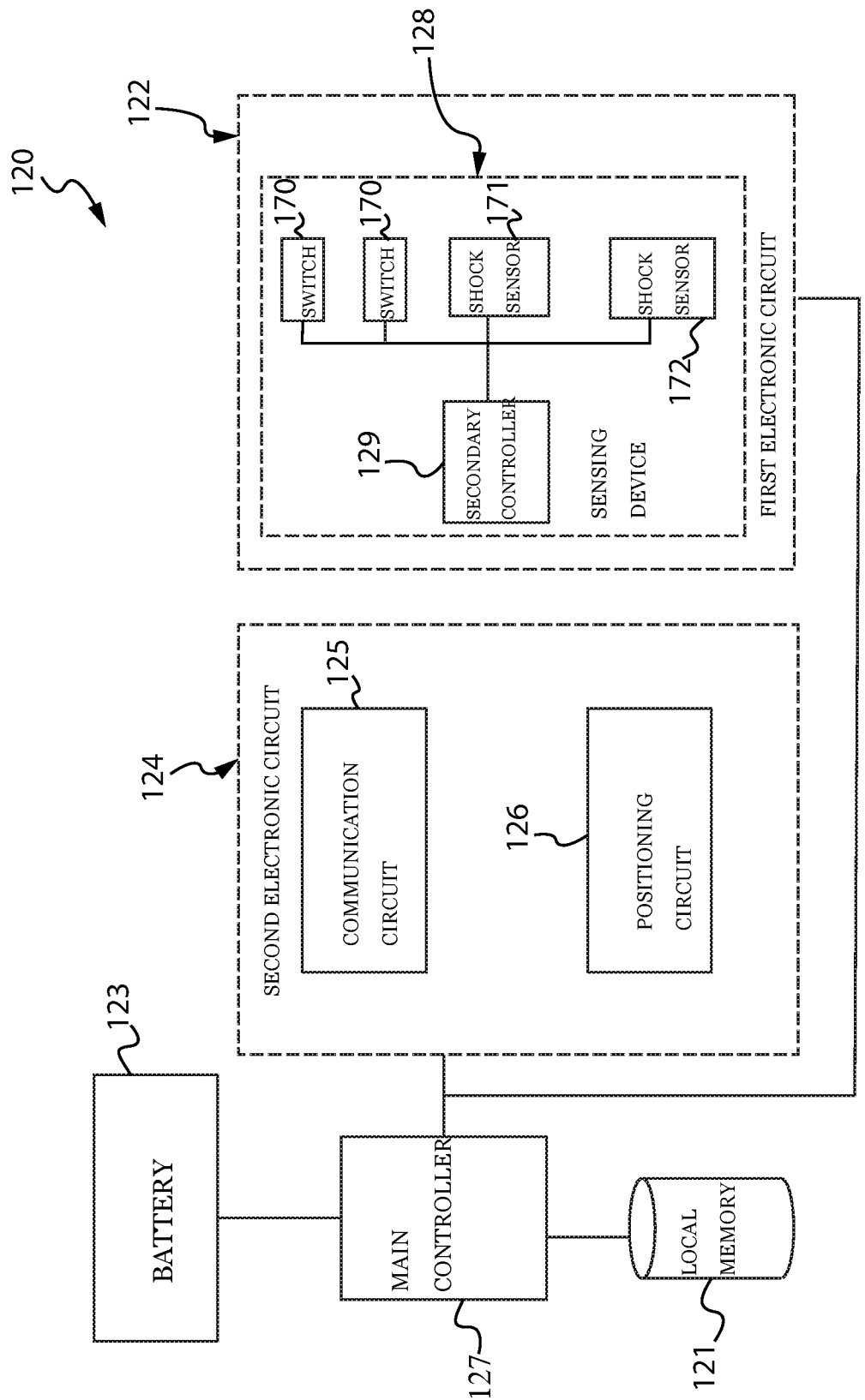
FIG. 2 is a block-diagram representing the electronic circuits of a tracker device of the tracking system of FIG. 1.

In particular, as it is shown in FIG. 2, the tracker device 120 comprises a main controller 127 configured for controlling all the electronic circuits and components of the tracker device 120.

The sensing device 128 comprises: at least two mechanical tilt switches 170 associated with one of the two flange 112 of the cable drum 110 so that they are integral with the flange 112; in particular, the at least two mechanical tilt switches 170 are positioned parallel to and off-centered with respect to the flange 112 of the cable drum 110 so that they sequentially assume the open position and the close position when the cable drum 110 rotates around a longitudinal axis defining a sequence of change of state of the at least two mechanical tilt switches 170 that corresponds to a complete rotation of the cable drum 110; one or more shock sensor 171, 172 configured for detecting shocks of the cable drum; a secondary controller 129 associated with the mechanical tilt switches 170 and with the shock sensors; the secondary controller 129 is configured for detecting the change of state of the mechanical tilt switches 170 and for counting the number of rotations of the cable drum 110. The counting of the number of rotations of the cable drum is performed by counting the occurrence of the sequence of change of state of the at least two mechanical tilt switches 170 that corresponds to a complete rotation of the cable drum 110.

The mechanical tilt switches 170 assures that the sequence of openings and closings of the tilt switches occur in the right order within appropriate timings if the rotation speed is comprised between a minimum value and a maximum value. The minimum value of the rotation speed for example can be a revolution per 30 s. The maximum value of the rotation speed for example can be a revolution per 500 ms. If the mechanical tilt switches detect a complete rotation within 500 milliseconds this movement is interpreted as a vibration instead of a revolution. By using more mechanical tilt switches it is possible to increase accuracy, to the detriment of energy consumption.

Optionally, the two mechanical tilt switches are positioned with an angle greater 9o0 to each other.

In the particular embodiment illustrated in FIG. 3, the sensing device 128 comprises two pairs of the mechanical tilt switches 170 associated with the flange 112 of the cable drum 110 and positioned about 180° one pair from the other; in this case the mechanical tilt switches of each pair are positioned with an angle greater than 90° to each other.

Alternatively, the sensing device 128 comprises three mechanical tilt switches 170 associated with the flange 112 of the cable drum 110; in this case the mechanical tilt switches 170 are positioned with an angle of about 60° to each other.

The mechanical tilt switches 170 are, for example, rolling ball switches installed on a Printed Circuit Board (PCB) that is associated with the flange 112 so that the PCB containing the mechanical tilt switches 170 results to be parallel to the flange 112.

The one or more shock sensors can be configured for verifying whether the cable drum is rotating around its longitudinal axis (Y). In this case, the counting of the number of rotations of the cable drum starts if the one or more shock sensors verifies that the cable drum is rotating around its longitudinal axis (Y).

The shock sensors can comprise a gyroscope, or a biaxial/triaxial accelerometer and a gyroscope, or a couple of biaxial/triaxial accelerometer.

In this description, the biaxial accelerometer may be an accelerometer capable of detecting displacements along the two axes orthogonal to the longitudinal axis Y.

As it is known a biaxial accelerometer can be replaced by a pair of uniaxial accelerometers, as well as a triaxial accelerometer can be replaced by three uniaxial accelerometers. Moreover, a gyroscope can be replaced by two biaxial/triaxial accelerometers.

In light of the presence of at least a gyroscope or of a couple of biaxial/triaxial accelerometers, the shock sensors are then capable of verifying whether the cable drum is effectively rotating around its longitudinal axis and is not translating, so as to allow to discriminate false positives on rotations counts. The combined use of mechanical tilt switches 170 and of a gyroscope or of a couple of biaxial/triaxial accelerometers provides the capability to count effective spins around the longitudinal axis (Y). Moreover, the shock sensors 171, 172 can be also capable of detecting the rotation speed of the cable drum. The combination of the detection of the number of rotations and the speed of the rotation can provide information about potential harms to the cable in case it is tugged with excessive force.

In this case, the secondary controller 129 is configured for verifying whether the cable drum rotates constantly around its longitudinal axis Y at a rotation speed higher than a minimum value, for example one revolution every 30 seconds. In case of a positive outcome of this verification the secondary controller 129 exploits the counting of the number of rotations of the cable drum around its longitudinal axis.

In this way, it is possible to avoid the counting of the number of rotations in the situations that are far from regular operation conditions, thus saving electrical power.

If the cable drum is not rotating constantly it more likely means that it is being pulled, pushed, or loaded to or from transportation equipment, and this scenario is far from regular operations. The sensing device 128 optionally is configured to detect also environmental parameter like for example temperature, humidity, atmospheric pressure; in this case the sensing device 128 comprises also a temperature sensor and/or a humidity sensor and/or a barometer for measuring the atmospheric pressure.

The communication circuit 125 comprises wireless transceivers adapted to transmits data signals on a wireless communication system, like for example a GSM/GPRS network or a Narrowband network or a Bluetooth link.

The positioning circuit 126 comprises a satellite positioning circuit such as GPS, Glonass, Beidou or Galileo adapted for receiving position coordinates at scheduled time optionally controlled by the main controller 127.

Optionally, the tracker device 120 comprises a sensor adapted to activate the tracker device 120 when it is attached to the cable drum 110. This sensor can be a magnetic switch adapted to activate the tracker device 120 when it is aligned with magnets positioned on the cable drum 110 at the correct mounting position of the tracker device 120.

Alternatively, this sensor can be a near-field communication (NFC) switch device associated to the tracker device and configured for activating/deactivating the tracker device when it receives a control signal. This control signal can be send by a terminal, like for example a smartphone.

The database 130 can be a cloud memory with which it is possible to communicate in a wireless manner.

To ensure sufficient strength and durability, the circuits of the tracker device 120 are sprayed with a special resin that does not interfere with the electronic operation of the circuits and does not induce any magnetic field for the operation of radio transmissions.

In this case, the secondary controller 129 is configured for verifying whether the cable drum rotates constantly around its longitudinal axis Y at a rotation speed higher than a minimum value, for example one revolution every 30 seconds. In case of a positive outcome of this verification the secondary controller 129 exploits the counting of the number of rotations of the cable drum around its longitudinal axis.

In this way, it is possible to avoid the counting of the number of rotations in the situations that are far from regular operation conditions, thus saving electrical power.

If the cable drum is not rotating constantly it more likely means that it is being pulled, pushed, or loaded to or from transportation equipment, and this scenario is far from regular operations. The sensing device 128 optionally is configured to detect also environmental parameter like for example temperature, humidity, atmospheric pressure; in this case the sensing device 128 comprises also a temperature sensor and/or a humidity sensor and/or a barometer for measuring the atmospheric pressure.

The communication circuit 125 comprises wireless transceivers adapted to transmits data signals on a wireless communication system, like for example a GSM/GPRS network or a Narrowband network or a Bluetooth link.

The positioning circuit 126 comprises a satellite positioning circuit such as GPS, Glonass, Beidou or Galileo adapted for receiving position coordinates at scheduled time optionally controlled by the main controller 127.

Optionally, the tracker device 120 comprises a sensor adapted to activate the tracker device 120 when it is attached to the cable drum 110. This sensor can be a magnetic switch adapted to activate the tracker device 120 when it is aligned with magnets positioned on the cable drum 110 at the correct mounting position of the tracker device 120.

Alternatively, this sensor can be a near-field communication (NFC) switch device associated to the tracker device and configured for activating/deactivating the tracker device when it receives a control signal. This control signal can be send by a terminal, like for example a smartphone.

The database 130 can be a cloud memory with which it is possible to communicate in a wireless manner.

To ensure sufficient strength and durability, the circuits of the tracker device 120 are sprayed with a special resin that does not interfere with the electronic operation of the circuits and does not induce any magnetic field for the operation of radio transmissions.

The positioning circuit 126, in particular, is configured to the detect the position coordinates of the tracker device 120 and of the cable drum 110 by means of a satellite positioning circuit such as GPS, Glonass, Beidou or Galileo or by means of data retrieved by the communication circuit 125 from the communication system or other networks like for example a Low Earth Orbit network.

In absence of a satellite signal the position coordinates are obtained through the GSM module by triangulating or trilaterating calculations performed by the processor 140.

If it is not possible to determine the position of the tracker device the processor 140 can indicate the partial reliability of the received data.

After that, the tracker identifier, the detected position coordinates and the detected events stored in the local memory 121 are transmitted to the database 130 via the communication system 160. The transmission is exploited through the communication circuit 125.

Optionally, after the transmission at least part of the local memory 121 is cleaned. In particular, all previous stored information except the last one and the data just sent are removed.

In any case, the activating of the second electronic circuit 124 and the subsequent steps occur at pre-set intervals controlled by the main controller 127.

Optionally, the activating of the second electronic circuit 124 and the subsequent steps occur when the tracker device 120 has been attached to the cable drum 110; this may be obtained by providing the tracker device 120 with the magnetic switch or with the near-field communication (NFC) switch device previously described.

According to another further option, the activating of the second electronic circuit 124 and the subsequent steps occur when a request of synchronization signal is received by the communication circuit 125.

In this case, the request of synchronization signal may be sent by the processor 140 following a command of a user. In this way, it is possible to retrieve data at any time.

After the transmitting step the second electronic circuit 124 is switched to standby mode by the main controller 127. The switching to standby mode after the transmission occurs regardless of the output of the transmission, which guarantees preventive battery degradation and offers the opportunity to develop a database side alert logic.

The main controller 127 can have an internal clock which performs a countdown of given time corresponding to the scheduled time interval.

In this case, when the first electronic circuit 122 of the tracker device 120 is activated, the event detected by the sensing device 128 is stored in the local memory 121 with the countdown value corresponding to the time of the activation of said first electronic circuit 122. In this way, it is possible to calculate the time at which each stored event occurred.

Optionally, before the second electronic circuit 124 is switched to standby mode the method for tracking cable drums according to the present disclosure provides the steps of checking whether new configuration data are available in the database, in case of a positive outcome of this verification downloading the new configuration data and applying the new configuration to the tracker device electronic circuits.

In fact, the communications between the tracker device and the database can be bidirectional so it is possible to manage and adjust the tracker device settings (firmware, frequency, schedule of the transmission and so on).

The transmitted data are then associated to the tracker identifier and the drum identifier in the database 130.

Then, the processor 140 calculates using the data stored in the database 130 the remaining length of the cable 150 on the cable drum 110.

In particular, the data detected from the sensing device 128 are required to calculate the amount of cable still present on the cable drum 110. This processing requires also that the drum dimensions (core diameter, inner drum width) and cable dimensions (diameter, length) are known.

The calculated remaining length of the cable 150 can then be stored in the database 130 associated with the tracker identifier and the drum identifier.

The system and the method for tracking cable drum according to the present disclosure has many advantages.

The database 130 and the processor 140 can be part of a Web portal or Web Platform capable of collecting and processing all the information found on the territory ensuring sufficient flexibility in terms of evolution and delivery of the service. In this case, the processor 140 can be provided with a software capable of: searching and locating single cable drum through geographic view; defining alarms based on the position of the cable drum in relation to defined geographic areas (Geofencing) and/or based on the time in a specific location, especially in a configuration where the transmission frequency is increased; providing historical traceability of each cable drum and/or about cable amount based on detected positions; generating report for cable drums flows and stocks in the territory; integrating with external services (i.e. Shipping Providers).

By managing location information and geofencing areas such as production plant and delivery address, the Web Platform can be configured to notify either through SMS or e-mail the configured distribution list for a given order (the order, drum, customer and all related information are associated to the tracker during the association phase) about drum's status changes: Preparing, Ready, Shipping, Delivered.

The Web Platform has the dual function to collect data from each deployed tracker device 120 and managing their settings from remote.

In fact, the Web Platform can send remote commands and even to reprogram the tracker devices 120 firmware remotely.

The Web Platform can also be configured to aggregate data from the field (from the trackers) with data coming from production systems such as MES, SAP, etc. through API, EDI or similar integration.

By knowing the amount of cable left on each cable drum it is possible to manage and generate alerts or notification about stocks running low, proposing actions such as order reissue or other customer relationship activities.

What is claimed is:

1. A method for tracking cable drums comprising:
   attaching a tracker device with a tracker identifier to a cable drum with a drum identifier, the drum identifier being associated in a database with drum dimensions and with cable dimensions of a cable stored on the drum;
   associating in the database the drum identifier with the tracker identifier;
   when an event comprising at least a shock and/or a number of rotations of the cable drum around a longitudinal axis occurs, activating a first electronic circuit of the tracker device including a sensing device that detects the event, storing the detected event in a local memory of the tracker device and switching the first electronic circuit to a standby mode after the detected event is stored;
   activating a second electronic circuit including a communication circuit that connects to a wireless communication system and a positioning circuit that detects the position coordinates of the tracker device and the cable drum, transmitting, to the database via the communication system, the tracker identifier, the detected position coordinates and the detected events stored in the local memory;
   associating the transmitted detected position coordinates and the transmitted detected events to the tracker identifier and the drum identifier in the database;

calculating, using the drum dimensions and the cable dimensions stored in the database, the remaining length of the cable on the cable drum; and wherein the activating of the second electronic circuit, the associating of the transmitted detected position coordinates and the transmitted detected events, and the calculating occur at scheduled time intervals and wherein, after the transmitting, the second electronic circuit is switched to the standby mode.

2. The method for tracking cable drums according to claim 1, wherein, after the transmitting, a part of the local memory is cleaned.

3. The method for tracking cable drums according to claim 1, wherein the positioning circuit detects the position coordinates of the tracker device and the cable drum using a satellite positioning circuit or from data retrieved from the communication system by the communication circuit.

4. The method for tracking cable drums according to claim 1, further comprising before the second electronic circuit is switched to standby mode, checking whether new configuration data are available in the database and in case of a positive outcome of this verification downloading the new configuration data and applying the new configuration to the first electronic circuit of the tracker device.

5. The method for tracking cable drums according to claim 1, wherein the sensing device detects an environmental parameter.

6. The method for tracking cable drums according to claim 1, wherein the activating of the second electronic circuit, the associating of the transmitted detected position coordinates and the transmitted detected events, and the calculating occur when the tracker device is attached to the cable drum.

7. The method for tracking cable drums according to claim 1, wherein the activating of the second electronic circuit, the associating of the transmitted detected position coordinates and the transmitted detected events, and the calculating occur in response to a control signal being received by the communication circuit.

8. The method for tracking cable drums according to claim 1, wherein the activating of the second electronic circuit, the associating of the transmitted detected position coordinates and the transmitted detected events, and the calculating occur in response to a control signal being received by a near-field communication (NFC) switch device associated to the tracker device and configured for activating/deactivating the tracker device.

9. The method for tracking cable drums according to claim 1, wherein the sensing device detects shocks above a predetermined threshold force value.

10. The method for tracking cable drums according to claim 1, wherein the sensing device comprises:
two mechanical tilt switches positioned parallel to and off-centered to a flange of the cable drum so that they sequentially assume an open position and a close position when the cable drum rotates around a longitudinal axis defining a sequence of change of state of the two mechanical tilt switches that corresponds to a complete rotation of the cable drum;
one or more shock sensors configured for detecting shocks of the cable drum; and
wherein the detection of the number of rotations of the cable drum around its longitudinal axis comprises:
detecting the change of state of the mechanical tilt switches; and
counting the number of rotations of the cable drum around a longitudinal axis by counting an occurrence of the sequence of change of state of the two mechanical tilt switches that corresponds to a complete rotation of the cable drum.

11. The method for tracking cable drums according to claim 9, wherein the one or more shock sensors are also configured for verifying whether the cable drum is rotating around its longitudinal axis and the step of counting the number of rotations of the cable drum starts if the one or more shock sensors verify that the cable drum is rotating around its longitudinal axis.

12. The method for tracking cable drums according to claim 10, wherein the step of counting the number of rotations of the cable drum is exploited if it is verified that the cable drum rotates substantially constantly around its longitudinal axis at a rotation speed higher than a minimum value.

13. The method for tracking cable drums according to claim 9, further comprising:
correcting with a gyroscope the number of counted rotations when the cable drum is rotating around a longitudinal axis not parallel to the earth plane.

14. The method for tracking cable drums according to claim 1, wherein the sensing device comprises:
one or more accelerometers and a gyroscope; and
wherein the one or more accelerometers are configured for verifying whether the cable drum is rotating around a longitudinal axis and wherein the gyroscope is configured to count the number of rotation after it is verified that the cable drum is rotating.

15. The method for tracking cable drums according to claim 1, wherein the tracker device comprises a main controller that has an internal clock which performs a countdown of given time corresponding to the scheduled time interval, and wherein the event detected by the sensing device is stored in the local memory with a countdown value corresponding to the time of the activation of said first electronic circuit.

16. A system for tracking cable drums comprising:
a cable drum having a drum identifier;
a tracker device having a tracker identifier attached to the cable drum, the tracker device comprising
a first electronic circuit comprising a sensing device configured to detect an event comprising a shock and/or rotations of the cable drum around a longitudinal axis of the cable drum,
a second electronic circuit comprising a communication circuit configured to connect to a wireless communication system and a positioning circuit configured to detect the position coordinates of the tracker device and the cable drum,
a local memory storing the tracker identifier,
a main controller is configured to
activate the first electronic circuit when the event is detected,
store the detected event in the local memory,
switch the first electronic circuit to a standby mode after the detected event is stored in the local memory,
a database capable of communicating with the tracker device, the drum identifier being associated in the database with drum dimensions and with cable dimensions of a cable stored on the drum, the drum identifier being associated with the tracker identifier in the database;
a processor associated to the database;
wherein the main controller is configured to
activate the communication and the positioning circuits of the second electronic circuit, transmit, to the database via the communication system, the tracker identifier, the detected position coordinates and the detected event stored in the local memory, and send the second electronic circuit to standby mode after the transmit;

wherein the database is configured to associate the transmitted detected position coordinates and the transmitted detected events to the tracker identifier and the drum identifier in the database;

wherein the processor when executed with instructions is configured to calculate, using the drum dimensions and the cable dimensions stored in the database, the remaining length of the cable on the cable drum; and wherein the activating of the second electronic circuit, the associating of the transmitted detected position coordinates and the transmitted detected events, and the calculating occur at scheduled time intervals.

17. The system according to claim 15, wherein the sensing device comprises:

two mechanical tilt switches positioned parallel to and off-centered to a flange of the cable drum so that they sequentially assume an open position and a close position when the cable drum rotates around a longitudinal axis defining a sequence of change of state of the two mechanical tilt switches that corresponds to a complete rotation of the cable drum;

one or more shock sensors configured for detecting shocks of the cable drum, wherein the sensing device is configured to detect a number of rotations of the cable drum around its longitudinal axis by detecting the change of state of the mechanical tilt switches; and counting the number of rotations of the cable drum around a longitudinal axis by counting an occurrence of the sequence of change of state of the two mechanical tilt switches that corresponds to a complete rotation of the cable drum.

18. The system according to claim 15, wherein the sensing device comprises:

one or more accelerometers and a gyroscope, wherein the one or more accelerometers are configured for verifying whether the cable drum is rotating around a longitudinal axis and wherein the gyroscope is configured to count the number of rotations after it is verified that the cable drum is rotating.

19. The system according to claim 15, further comprising:

a gyroscope configured to provide measurements for correcting the number of counted rotations when the cable drum is rotating around a longitudinal axis not parallel to the earth plane or when the cable drum is rotating around a longitudinal axis not parallel to the earth plane.

20. A tracker device for tracking cable drums comprising:

a sensing device configured to be attached to a cable drum and configured to detect an event comprising a shock and/or rotations of the cable drum around a longitudinal axis of the cable drum, the cable drum having a drum identifier and the tracker device having a tracker identifier, the drum identifier being associated with drum dimensions and with cable dimensions of a cable stored on the drum, the drum identifier being associated with the tracker identifier;

a communication circuit configured to connect to the database;

a positioning circuit configured to detect the position coordinates of the tracker device and the cable drum;

a local memory storing a tracker identifier; and a main controller is configured to activate the sensing device when the event is detected, store the detected event in the local memory, switch the sensing device to a standby mode after the detected event is stored in the local memory, in response to the event being detected, activate the positioning circuit to determine position coordinates of the tracker device and the cable drum, activate the communication circuit to transmit, to the database, the tracker identifier, the detected position coordinates and the detected event stored in the local memory, and send the communication circuit and the positioning circuit to standby mode after the transmit.

21. The tracker device of claim 19, wherein the sensing device comprises:

one or more accelerometers and a gyroscope, wherein the one or more accelerometers are configured for verifying whether the cable drum is rotating around a longitudinal axis and wherein the gyroscope is configured to count the number of rotations after it is verified that the cable drum is rotating.

* * * * *